US012658458B2

(12) United States Patent
Lee et al.

(10) Patent No.: US 12,658,458 B2
(45) Date of Patent: Jun. 16, 2026

(54) FUEL CELL START CONTROL SYSTEM AND CONTROL METHOD THEREFOR

(71) Applicants: Hyundai Motor Company, Seoul (KR); Kia Corporation, Seoul (KR)

(72) Inventors: Jae Gwang Lee, Seoul (KR); Won Sik Jeong, Pyeongtaek-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 596 days.

(21) Appl. No.: 18/135,421

(22) Filed: Apr. 17, 2023

(65) Prior Publication Data

US 2024/0120512 A1 Apr. 11, 2024

(30) Foreign Application Priority Data

Oct. 6, 2022 (KR) ........................ 10-2022-0128004

(51) Int. Cl.
| | |
|---|---|
| *H01M 8/04225* | (2016.01) |
| *H01M 10/44* | (2006.01) |
| *H01M 10/46* | (2006.01) |
| *H01M 16/00* | (2006.01) |
| *H02J 7/80* | (2026.01) |
| *H02J 7/90* | (2026.01) |

(52) U.S. Cl.
CPC ....... *H01M 8/04225* (2016.02); *H01M 10/44* (2013.01); *H01M 10/46* (2013.01); *H01M*

*16/006* (2013.01); *H02J 7/80* (2026.01); *H02J 7/933* (2026.01); *H02J 2207/20* (2020.01)

(58) Field of Classification Search
None
See application file for complete search history.

(56) References Cited

U.S. PATENT DOCUMENTS

2019/0288307 A1* 9/2019 Kim ........................ B60L 58/12
2023/0402639 A1* 12/2023 Ryu ................... H01M 8/04302

FOREIGN PATENT DOCUMENTS

KR 10-2018-0050837 A 5/2018

* cited by examiner

*Primary Examiner* — Wyatt P McConnell
(74) *Attorney, Agent, or Firm* — Morgan, Lewis & Bockius LLP

(57) ABSTRACT

The fuel cell start control system includes a plurality of fuel cell stacks configured to generate power by receiving air and fuel, a power storage device connected to a bidirectional converter and configured to be charged by generated power of a respective fuel cell stack or configured to supply power, and includes a controller configured to control a start of a fuel cell stack among the plurality of fuel cell stacks which satisfies a start condition based on a fuel cell stack starting request, the controller configured to control a start of at least one fuel cell stack based on generated power of the fuel cell stack or charged power of at least one power storage device.

5 Claims, 7 Drawing Sheets

FUEL CELL START CONTROL SYSTEM AND CONTROL METHOD THEREFOR

CROSS REFERENCE TO RELATED APPLICATION

The present application claims priority to Korean Patent Application No. 10-2022-0128004, filed Oct. 6, 2022 in the Korean Intellectual Property Office, the entire contents of which are incorporated herein for all purposes by this reference.

TECHNICAL FIELD

The present disclosure relates to a fuel cell start control system and a control method therefor. More particularly, the present disclosure relates to a fuel cell start control system and a control method for the fuel cell start control system that is for efficiently controlling a start of a plurality of fuel cell systems by monitoring a power storage device and a bidirectional converter.

BACKGROUND

A fuel cell is configured to convert chemical energy into electric energy by using an oxidation-reduction reaction between hydrogen and oxygen that are respectively supplied from a hydrogen supply device and an air supply device. Furthermore, the fuel cell includes a fuel cell stack config-ured to generate electric energy, a cooling system for cooling the fuel cell stack, and so on.

That is, hydrogen is supplied to an anode of the fuel cell, and an oxidation reaction of hydrogen proceeds in the anode so that hydrogen ions (protons) and electrons are generated. At this time, the generated protons and the generated elec-trons move to a cathode through an electrolyte membrane and an external wire, respectively. The cathode generates electric energy through an electrochemical reaction between the protons and electrons from the anode and oxygen in the air.

At this time, each individual fuel cell stack that constitutes a plurality of fuel cell stacks may be constituted of a low-voltage battery connected to a bidirectional low voltage DC-DC converter (BLDC).

When a start of the plurality of fuel cell stacks is con-trolled at the same time, there is a fuel cell stack in which the start thereof is capable of being controlled. However, due to problems that a voltage of the low-voltage battery is lowered, the BLDC has failed, and so on, the start of an individual fuel cell stack in which the problems occurring is not capable of being controlled, so that there is a problem that the start of an entire configuration of the plurality of fuel cell stacks is not capable of being controlled.

The foregoing is intended merely to aid in the understand-ing of the background of the present disclosure, and is not intended to mean that the present disclosure falls within the purview of the related art that is already known to those skilled in the art.

SUMMARY

Accordingly, the present disclosure has been made keep-ing in mind the above problems occurring in the related art, and an objective of the present disclosure is to provide a fuel cell start control system and a control method for the fuel cell start control system that is for efficiently controlling a start of a plurality of fuel cell systems by monitoring a power storage device and a bidirectional converter.

In order to achieve the above objective, there is provided a fuel cell start control system including: a plurality of fuel cell stacks configured to generate power by receiving air and fuel; a power storage device connected to a bidirectional converter and configured to be charged by generated power of a respective fuel cell stack of the plurality of fuel cell stacks or configured to be discharged so as to supply power; and a controller configured to control a start of a fuel cell stack among the plurality of fuel cell stacks which satisfies a start condition based on a fuel cell stack starting request, the controller being configured to control a start of at least one fuel cell stack based on generated power of the fuel cell stack that is started-up or charged power of at least one power storage device connected to the at least one fuel cell stack and charged by the generated power of the fuel cell stack that is started-up.

For example, the start condition may include a voltage condition of the at least one power storage device connected to the at least one fuel cell stack, and may include a failure condition of at least one bidirectional converter.

For example, when a charging voltage of the power storage device connected to the at least one fuel cell stack is less than a reference value, the controller may be configured to determine whether the at least one bidirectional converter is normal, thereby controlling the start of the at least one fuel cell stack.

For example, in response to a determination that the at least one bidirectional converter is normal, the controller may be configured to control such that the at least one power storage device connected to the at least one fuel cell stack is charged by the generated power of the fuel cell stack that is started-up.

For example, in response to a determination that the at least one bidirectional converter is not normal the controller may be configured to control the start of the at least one fuel cell stack excluding a fuel cell stack connected to the at least one bidirectional converter.

For example, the controller may be configured to control the start of the at least one fuel cell stack based on the charged power of the at least one power storage device after the at least one power storage device connected to the at least one fuel cell stack is completely charged.

For example, the controller may be configured to calcu-late the generated power of the fuel cell stack that is started-up, and may be configured to calculate the number of fuel cell stacks in which the start thereof is capable of being controlled based on the calculated generated power.

For example, the controller may be configured to calcu-late the number of fuel cell stacks in which the start thereof is capable of being controlled based on the generated power of the fuel cell stack that is started-up, a required power of an auxiliary device after a started-up state, and a power consumption of the auxiliary device at the started-up state.

For example, the controller may be configured to calcu-late a value as a target output in which the value is obtained by subtracting a power consumption of an auxiliary device from a value obtained by adding generated power of the plurality of fuel cell stacks and supplied power of the power storage device, and may be configured to control the start of the fuel cell stack according to the calculated target output.

In order to achieve the above objective, there is provided a fuel cell start control method in a fuel cell start control system including a plurality of fuel cell stacks configured to generate power by receiving air and fuel, a power storage device connected to a bidirectional converter and configured to be charged by generated power of a respective fuel cell stack or configured to be discharged so as to supply power, comprising: controlling a start of a fuel cell stack among the plurality of fuel cell stacks which satisfies a start condition based on a fuel cell stack starting request; and controlling a start of at least one fuel cell stack based on generated power of the fuel cell stack that is started-up or charged power of at least one power storage device connected to the at least one fuel cell stack and charged by the generated power of the fuel cell stack that is started-up.

For example, the start condition may include a voltage condition of the at least one power storage device connected to the at least one fuel cell stack and a failure condition of at least one bidirectional converter. Furthermore, in the controlling the start of the at least one fuel cell stack, the method comprises: when a charging voltage of the at least one power storage device connected to the at least one fuel cell stack is less than a reference value, determining whether the at least one bidirectional converter is normal, thereby controlling the start of the at least one fuel cell stack.

For example, the method comprises: in response to a determination that the at least one bidirectional converter is normal, controlling the at least one power storage device such that the at least one power storage device connected to the at least one fuel cell stack is charged by the generated power of the fuel cell stack that is started-up.

For example, the method comprises: in response to a determination that the at least one bidirectional converter is not normal, controlling the start of the at least one fuel cell stack excluding a fuel cell stack connected to the at least one bidirectional converter.

For example, in the controlling the start of the individual fuel cell stack, the start of the at least one fuel cell stack may be controlled based on the charged power of the at least one power storage device after the at least one power storage device connected to the at least one fuel cell stack is completely charged.

For example, calculating the generated power of the fuel cell stack that is started-up and then calculating the number of fuel cell stacks in which the start thereof is capable of being controlled based on the calculated generated power that is calculated may be further included.

According to the fuel cell start control system and the control method for the fuel cell start control system of the present disclosure, since the start of the plurality of fuel cell systems is capable of being efficiently controlled by monitoring the power storage device and the bidirectional converter, a start failure of a group constituting of the fuel cell stacks may be prevented and a start of the fuel cell stacks may be controlled according to a target output.

The effects that can be obtained from the present disclosure are not limited to the above-mentioned effects, and other effects not mentioned herein will be clearly understood by those skilled in the art from the following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
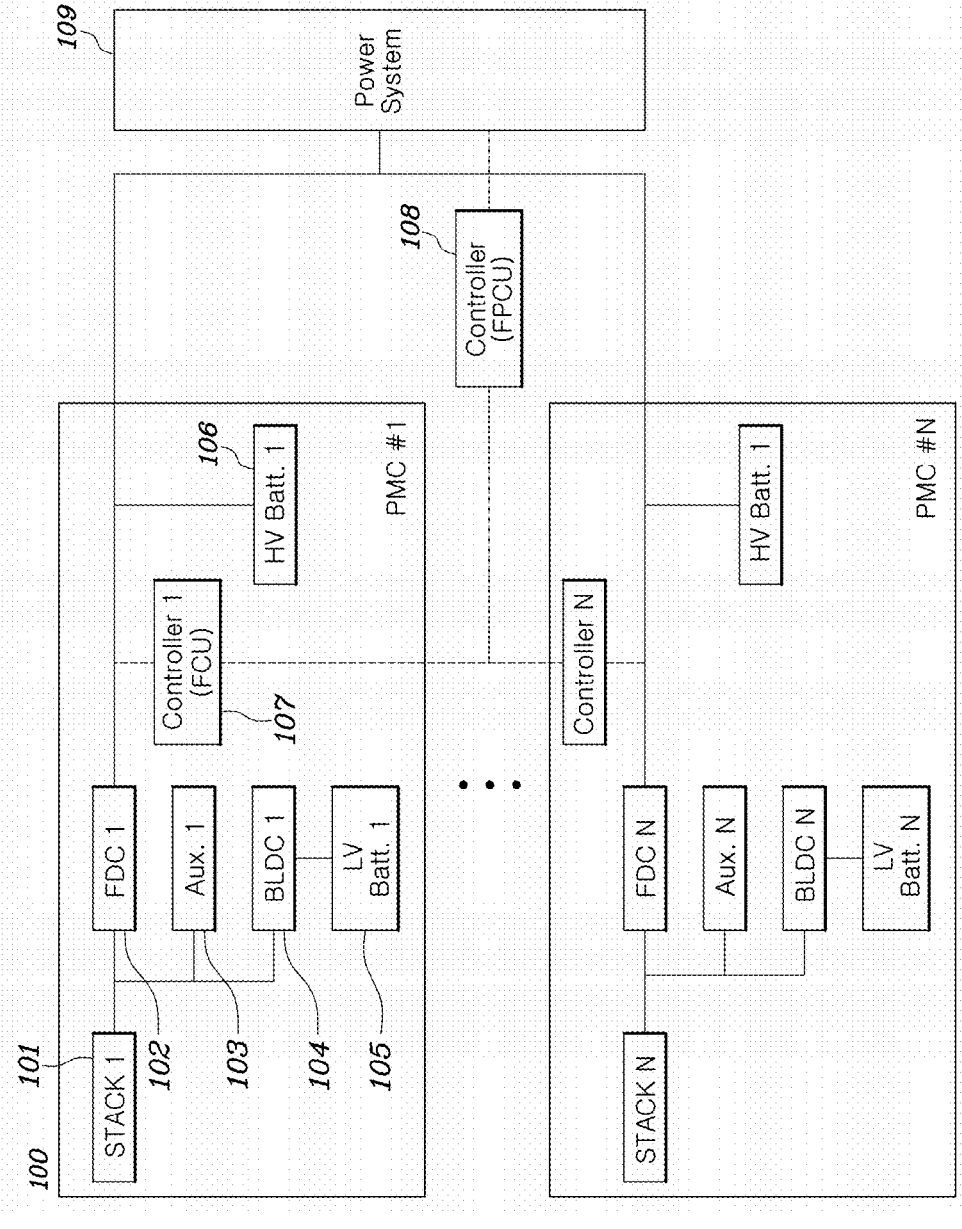
FIG. 1 is a block diagram illustrating a fuel cell start control system according to an embodiment of the present disclosure.

Hereinafter, exemplary embodiments disclosed in the present specification will be described in detail with reference to the accompanying drawings. In the present specification, the same or similar components will be denoted by the same or similar reference numerals, and a repeated description thereof will be omitted.

In the following description, the suffixes "module" and "portion" contained in terms of constituent elements to be described will be selected or used together in consideration only of the convenience of writing the following specification, and the suffixes "module" and "portion" do not necessarily have different meanings or roles.

It will be paid attention that detailed description of known technologies will be omitted if it is determined that the detailed description of the known technologies can obscure the embodiments of the disclosure. In addition, the accompanying drawings are merely intended to easily describe the embodiments of the disclosure, and the spirit and technical scope of the present disclosure is not limited by the accompanying drawings. It should be understood that the present disclosure is not limited to specific disclosed embodiments, but includes all modifications, equivalents and substitutes included within the spirit and technical scope of the present disclosure. Terms including ordinals such as "first" or "second" used herein may be used to describe various elements, but the elements are not limited by the terms. The terms are only used for the purpose of distinguishing one element from another element.

When a component is referred to as being "connected" or "contacted" to another component, it should be understood that it may be directly connected or contacted to the other component, but other components may exist therebetween. On the other hand, when a component is referred to as being "directly connected" or "directly contacted" to another component, it should be understood that there is no other component therebetween.

Singular expressions include plural expressions unless the context clearly indicates otherwise.

It is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, "unit" or "control unit" included in the names of the motor control unit (MCU) and the hybrid control unit (HCU) generally refer to a controller that controls a specific function of the vehicle and do not mean a generic function unit. Each controller unit may include a communication device configured to communicate with another control unit or a sensor in order to control a function assigned thereto, a memory configured to store an operating system, logic commands, and input and output information, and at least one processor configured to perform determination, calculation, and decision necessary to control the assigned function.

Prior to describing a control method of a fuel cell start control system according to embodiments of the present disclosure, a fuel cell start control system applicable to the embodiments will be described.

A fuel cell generates power by a chemical reaction between hydrogen and oxygen. Specifically, a polymer electrolyte fuel cell (PEFC) is used as driving energy of a fuel cell electric vehicle (FCEV) driven by a motor.

The polymer electrolyte fuel cell is used in the form of a fuel cell stack obtained by assembling a structure having several tens to several hundreds of unit cells repeatedly stacked on one another and a clamping device for maintaining a proper clamping pressure, wherein each unit cell includes a membrane electrode assembly (MEA) in which an electrode, mainly made up of catalyst layers on which a electrochemical reaction occurs, is attached to each of opposite sides of a polymer electrolyte membrane through which hydrogen ions (proton, H⁺) move, a separation plate (bipolar plate (BP)) including a gas diffusion layer (GDL) for evenly distributing reaction gases and a passage for the movement of the reaction gases and a coolant, and a gasket for securing the airtightness of the reaction gases and the coolant.

Particularly, in the membrane electrode assembly (MEA) in which a direct electrochemical reaction occurs, a pair of electrodes is arranged with a polymer electrolyte membrane therebetween. Hydrogen serving as a fuel gas is supplied to a hydrogen electrode (anode) occupying a predetermined volume in the fuel cell stack, and air including oxygen serving as an oxidizing gas is supplied to an air electrode (cathode).

The hydrogen supplied to the hydrogen electrode is split into hydrogen ions (proton, H⁺) and electrons (e⁻) by a catalyst in the hydrogen electrode attached to one surface of the polymer electrolyte membrane. Only the hydrogen ions selectively pass through the polymer electrolyte membrane, which is a cation exchange membrane, and moves to the air electrode attached to the other surface of the polymer electrolyte membrane, and the electrons are transferred to the air electrode through an external conductive wire. A chemical reaction in the fuel cell is represented by the following reaction formulas.

$$H_2 \rightarrow 2H^+ + 2e^- \quad \text{[Reaction in hydrogen electrode]}$$

$$\tfrac{1}{2}*O_2(g) + 2H^+ + 2e^- \rightarrow H_2O(l) \quad \text{[Reaction in air electrode]}$$

$$H_2(g) + \tfrac{1}{2}*O_2(g) \rightarrow H_2O(l) + \text{electrical energy} + \text{thermal energy} \quad \text{[Total reaction]}$$

As shown in the reaction formulas described above, the hydrogen molecule is dissociated into four hydrogen ions and four electrons at the anode. The electrons move through an external circuit and generate current (electrical energy), the hydrogen ions move to the cathode through the electrolyte membrane and perform a reduction electrode reaction, and water and heat are produced as a byproduct of the electrochemical reaction.

The fuel cell may be connected to a driving system such as a motor, a high-voltage battery, and a high-voltage balance-of-plants (BOPs) through a main line. The main line may be maintained at the same voltage as an output voltage of the fuel cell in the state in which the main line is connected to the fuel cell.

In addition, the fuel cell is connected to a power storage device which can be charged and discharged, and the power storage device may be charged with generated power of the fuel cell or may supply power to the outside by discharging charged power. Here, the power storage device may be a battery or a supercapacitor. Particularly, the power storage device may be a high-voltage battery (HV battery) or a low-voltage battery (LV battery).

Particularly, a bidirectional converter (Bi-directional High-Voltage DC-DC Converter (BHDC)) may further be provided between the high-voltage battery that is chargeable and the fuel cell.

In addition, a fuel processing line (FPL) for supplying and discharging hydrogen serving as fuel to the fuel cell, an air processing line (APL) for supplying and discharging air including oxygen serving as an oxidizer to the fuel cell, a thermal management line (TML) for removing heat, which is a fuel cell reaction byproduct of the fuel cell, out of a fuel cell system and managing water in the polymer electrolyte fuel cell, and balance-of-plants (BOPS) constituting the FPL, the APL, and the TML are included.

High-voltage BOPs of the fuel cell system includes a coolant stack pump (CSP), an air compressor (ACP), and a coolant heater (CHT), which are connected to the main line via the bidirectional converter from the high-voltage battery or the fuel cell and are operated by a high-voltage source.

In addition, low-voltage electronics (LV electronics) operated by a low voltage source may be connected to a low-voltage line (LV line) which connects the low-voltage battery (LV battery) for normal operations of the LV electronics and an operation of a controller to the low-voltage converter (low-voltage DC-DC converter (LDC)) arranged between the low-voltage battery and the bidirectional converter and connected to the low-voltage battery.

Hydrogen, which is fuel supplied from a hydrogen storage device, is mixed with a post-reaction gas and then supplied to the fuel cell through a fuel recirculation device such as an ejector in the fuel processing line, wherein the post-reaction gas includes unreacted hydrogen other than hydrogen which has participated and been used in the fuel cell reaction in the hydrogen electrode of the fuel cell stack, moisture generated by the fuel cell reaction in the air electrode of the stack and diffused to the hydrogen electrode through the polymer electrolyte membrane, and nitrogen, among air supplied to the air electrode by the air compressor and mainly including oxygen and the nitrogen, which remains in the air electrode without participating in the fuel cell reaction and is diffused from the air electrode to the hydrogen electrode through the polymer electrolyte membrane.

When moisture present in the fuel processing line a fuel gas is condensed as droplets while a fuel gas is circulated by the fuel recirculation device such as an ejector, the moisture is collected as liquid water by a water trap (FWT). When the liquid water becomes equal to or more than a predetermined amount, a drain valve (FDV) connected to the water trap switches from a closed state to an opened state for a predetermined time so that the liquid water is discharged to the air processing line and removed from the fuel processing line.

A purge valve (FPV) is in a closed state while the fuel cell is operated in a normal state. In this case, as the amount of hydrogen consumed by a fuel cell reaction increases, the concentration of hydrogen present in the hydrogen electrode gradually decreases. When the concentration of hydrogen present in the hydrogen electrode becomes equal to or lower than a predetermined level, the voltage of a fuel cell output terminal becomes lower, compared with when the concentration of hydrogen present in the hydrogen electrode under the same load condition is equal to or higher than the predetermined level. Thus, it is necessary to introduce new hydrogen into the hydrogen electrode of the fuel cell stack in order to maintain the concentration of hydrogen present in the hydrogen electrode at the predetermined level or higher.

To this end, the purge valve (FPV) switches from the closed state to an opened state for a predetermined time, a part of a post-reaction fuel gas of the hydrogen electrode of the fuel cell is discharged to the air processing line and is removed from the fuel processing line, and an equivalent amount of new hydrogen as the volume of the discharged post-reaction fuel gas is introduced into the hydrogen electrode of the fuel cell.

The part of the post-reaction fuel gas discharged to the air processing line is mixed with post-reaction air and then discharged to the outside, wherein the post-reaction air includes nitrogen and post-reaction oxygen other than oxygen participating in the fuel cell reaction among air supplied by the air compressor to the air electrode of the fuel cell for the fuel cell reaction, and moisture which is a by-product of the fuel cell reaction.

Air to be supplied by an air compressor is excessively supplied so that the concentration of hydrogen in a gas discharged to the outside as described above does not reach such a level as to become dangerous. In addition, a time during which the purge valve (FPV) remains opened is reduced in proportion to the amount of air supplied by the air compressor, thereby preventing the hydrogen concentration of the gas discharged to the outside from reaching such a level as to become dangerous even when a gas corresponding to the part of the post-reaction fuel gas discharged to the air processing line is added.

Particularly, the hydrogen concentration corresponding to such a level as to become dangerous is prescribed by regulations, and the hydrogen concentration prescribed by the regulations may be, for example, defined as being a maximum of 8% and equal to or smaller than a three-second average of 4%.

When the fuel cell enters a stop mode in which a normal operation thereof for generating power is finished, an operation of the air compressor is stopped and thus the introduction of air is stopped. Furthermore, in the state in which an air cut-off valve (ACV), a drain valve (FDV), and the purge valve (FPV) are closed, the voltage of the stack decreases to a ground voltage level and thus a small amount of reacted oxygen, nitrogen, and water remain at the air electrode. In addition, after the air cut-off valve (ACV) is closed, a hydrogen supply valve (FSV) for supplying hydrogen to a hydrogen processing line may also be closed.

In a storage state in which the stop mode is maintained, the hydrogen electrode and the air electrode of the stack are stored while being electrically connected to each other through a COD resistor, and the small amount of oxygen remaining in the air electrode is completely removed and simultaneously hydrogen of reacted gases remaining in the hydrogen electrode is diffused to the air electrode by a crossover through the polymer electrolyte membrane and becomes closer to a state of equilibrium as a storage time becomes longer.

During the restarting process to make the fuel cell enter a normal operation state and generate power again, the air cut-off valve (ACV) is opened and the air compressor operates to supply air to the air electrode of the fuel cell. Furthermore, the restarting process includes a time period in which a small amount of hydrogen, remaining in the air electrode within the stack while the stack voltage is elevated while the hydrogen having crossed over through the polymer electrolyte membrane from the storage state and having been diffused to the air electrode is discharged to the outside, coexists with oxygen in the air supplied by the air compressor. The larger the amount of air supplied to the air electrode in the stack through the air compressor, the shorter the time period described above.

The FC Stop mode is an idle state in which the power generation of the fuel cell is temporarily stopped in a start-up state. In this mode, the operation of the air compressor is stopped until a stopped vehicle receives an accelerator signal and restarts. However, when the vehicle starts to run again, the air cut-off valve (ACV) waits for a quick response of the fuel cell system in the opened state and in the state in which a predetermined stack voltage is secured.

Particularly, it is possible to enter the FC Stop mode when the running speed of the vehicle is equal to or lower than a preconfigured speed or when the required power of the fuel cell is equal to or smaller than preconfigured power and the state-of-charge (SOC) of the high-voltage battery is equal to or larger than a preconfigured SOC.

Even in the FC Stop mode, the hydrogen concentration in the air electrode increases due to a hydrogen crossover phenomenon in which hydrogen of the hydrogen electrode is diffused to the air electrode through the polymer electrolyte membrane. Particularly, in order to discharge the hydrogen in the air electrode to the outside so as not to cause safety problems, the air compressor is periodically and repeatedly operated for a predetermine time to remove the hydrogen in the air electrode out of the stack.

Reaction gases of the hydrogen electrode and the air electrode, which occupy predetermined volumes in the fuel cell for a vehicle, are discharged by opening and closing the air cut-off valve (ACV), the drain valve (FDV), and the purge valve (FPV).

According to an embodiment of the present disclosure, it is proposed that a start of a plurality of fuel cell systems is to be controlled on the basis of start conditions of a power storage device and a bidirectional converter that are monitored.

FIG. 1 is a block diagram illustrating a fuel cell start control system according to an embodiment of the present disclosure. Since FIG. 1 mainly illustrates components related to the embodiment, the fuel cell start control system may include more or fewer components when an actual fuel cell start control system is realized.

Referring to FIG. 1, a fuel cell start control system according to an embodiment of the present disclosure may include a plurality of fuel cell systems 100, a Fuel Cell Power Control Unit (FPCU) 108, and a power system 109. Here, the fuel cell system 100 may include a fuel cell stack 101, a fuel cell DC-DC Converter (FDC) 102, an auxiliary device 103, a bidirectional converter 104, a low-voltage battery 105, a high-voltage battery 106, and a fuel cell control unit (FCU) 107. The fuel cell start control system may include the plurality of fuel cell systems 100, and each fuel cell stack 101 may communicate with the FCU 107 that is connected to the fuel cell stack 101. In addition, the FDC 102 may control a voltage and current of the fuel cell stack 101, and the amount of generated power of the respective fuel cell stack 101 may be controlled by controlling the voltage and the current. In addition, the FCU 107 may diagnose and monitor a state of the fuel cell stack 101 in real time by communicating with the fuel cell stack 101. At this time, the FCU 107 may command an operation to the FDC 102 such that generated power of the fuel cell stack 101 is varied so as to satisfy a target output according to a state diagnosis result of the fuel cell stack 101.

Here, the target output may be calculated by subtracting a consumption power of the auxiliary device 103 from a value of the sum of generated power of the plurality of fuel cell stack 101 and supplied power of the high-voltage battery 106 in a controller (not illustrated). Furthermore, the FCU 107 may control the start of the fuel cell stack 101 according to the calculated target output. The auxiliary device 103 may include an auxiliary device (for example, an air compressor, a humidifier, a COD heater, a coolant pump, and so on). Furthermore, in the air compressor, when an initial start-up state, power may be boosted and supplied to the bidirectional converter 104 from the low-voltage battery 105. At this time, the start of the respective fuel cell stack 101 is completed according to an operation of the air compressor.

In addition, the FPCU 108, which is a superordinate central processor, may communicate with a plurality of FCUs 107 so that start-up/shut-down sequences and total amount of power generation/distribution of the plurality of fuel cell stacks 101 are controlled. Meanwhile, the power system 109 may transmit a power requirement to the FPCU 108 of the fuel cell stack 101, in which the FPCU 108 is before start controlled, and the FPCU 108 may calculate the number of respective fuel cell stacks 101 required to be start controlled. In the present disclosure, the FCU 107 or the FPCU 108 is referred to as the controller (not illustrated).

The controller (not illustrated) constituting the present disclosure may control the start of the fuel cell stack 101 that satisfies a start condition on the basis of a request of the start of the fuel cell stack 101. Here, the fuel cell stack 101 that satisfies the start condition may be a single fuel cell stack 101 or the plurality of fuel cell stacks 101. When the plurality of fuel cell stacks 101 satisfies the start condition, the plurality of fuel cell stacks 101 may be grouped by setting the fuel cell stack 101 satisfying the start condition as a representative fuel cell stack 101. After the fuel cell stacks 101 are grouped, two embodiments of the controller (not illustrated) may exist. Firstly, when the representative fuel cell stack 101 is started-up first, the start of the respective fuel cell stack 101 that is shut-down may be controlled on the basis of the generated power of the fuel cell stack 101 that is started-up. As another embodiment, the start of the representative fuel cell stack 101 and the start of the respective fuel cell stack 101 that is shut-down may be controlled at the same time.

According to an exemplary embodiment of the present disclosure, the controller may include a processor (e.g., computer, microprocessor, CPU, ASIC, circuitry, logic circuits, etc.) and an associated non-transitory memory storing software instructions which, when executed by the processor, provides the functionalities of the controller. Herein, the memory and the processor may be implemented as separate semiconductor circuits. Alternatively, the memory and the processor may be implemented as a single integrated semiconductor circuit. The processor may embody one or more processor(s).

Figure 2:
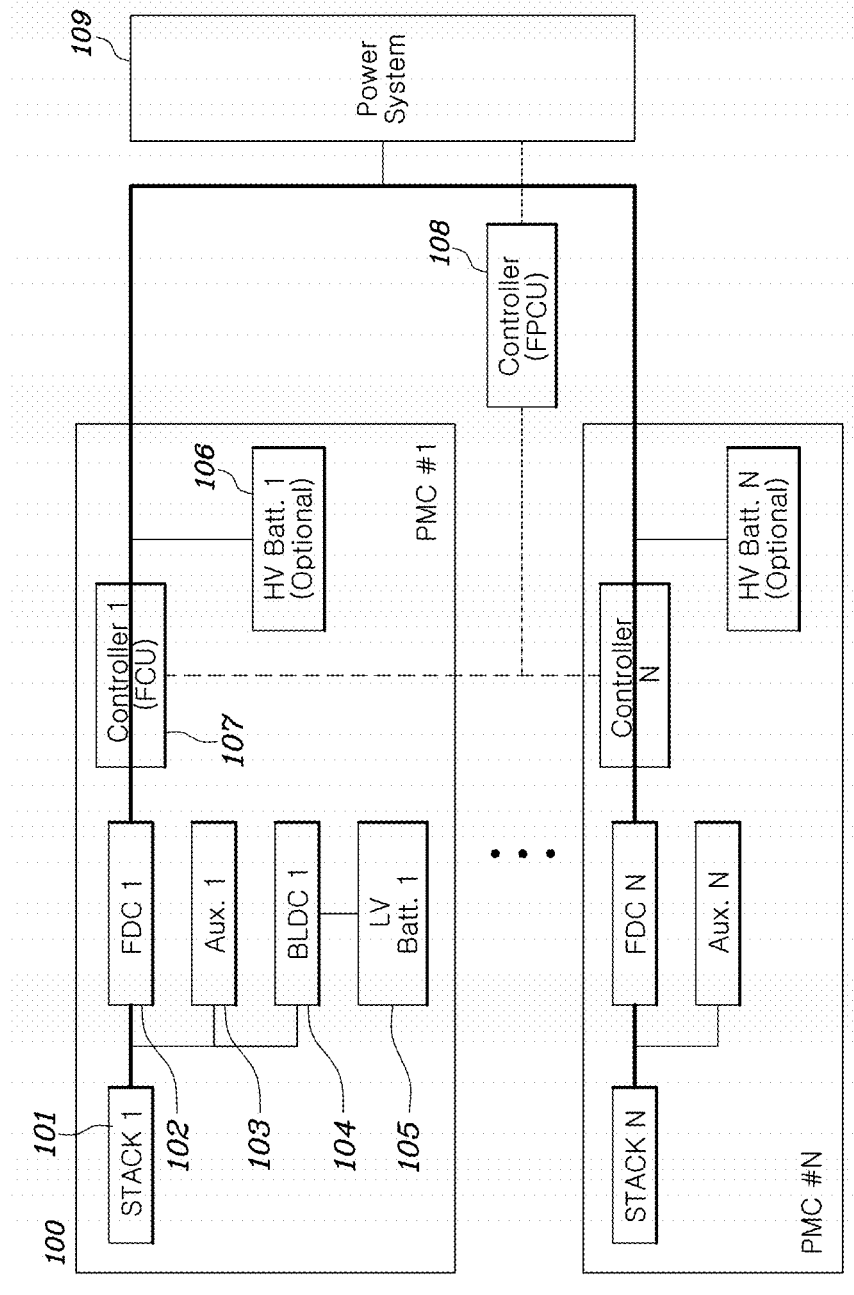
FIG. 2 is a block diagram illustrating a power flow of the fuel cell start control system according to an embodiment of the present disclosure, the fuel cell start control system controlling a start of an individual fuel cell stack on the basis of generated power of a fuel cell stack that is started-up.

FIG. 2 is a block diagram illustrating a power flow of the fuel cell start control system according to an embodiment of the present invention, the fuel cell start control system controlling the start of the individual fuel cell stack 101 on the basis of the generated power of the fuel cell stack 101 that is started-up.

Referring to FIG. 2, the controller (not illustrated) may firstly start-up the fuel cell stack 101 that satisfies the starting condition, and then is capable of controlling the individual fuel cell stack 101 on the basis of the generated power of the fuel cell stack 101 that is started-up.

Here, the start condition may include voltage conditions of the power storage devices 105 and 106 connected to the individual fuel cell stack 101, and may include a failure condition of the bidirectional converter 104. The voltage conditions of the power storage devices 105 and 106 refer to a voltage condition of the low-voltage battery 105, and may be determined on the basis of about 12 V that is a voltage of the low-voltage battery 105 that is generally used. When the voltage of the low-voltage battery 105 that is connected to the individual fuel cell stack 101 is equal to or more than 12 V, the controller (not illustrated) may control the start of the individual fuel cell stack 101.

Conversely, when a charge voltage of the low-voltage battery 105 connected to the individual fuel cell stack 101 is less than 12 V, whether the bidirectional converter 104 has failed or not may be determined first. This is to determine a possibility of charging of the low-voltage battery 105. Furthermore, when it is determined that the bidirectional converter 104 is normal, a voltage of the low-voltage battery 105 may be charged by stepping-down a voltage through the generated power of the representative fuel cell stack 101 that is started-up by the FDC 102. The controller (not illustrated) may charge the low-voltage battery 105 on the basis of the generated power of the fuel cell stack 101 until the voltage of the low-voltage battery 105 becomes 12 V or more, in which the fuel cell stack 101 is started-up. Furthermore, when the voltage of the low-voltage battery 105 becomes 12 V or more, the charging of the low-voltage battery 105 may be stopped.

When the charging of the low-voltage battery 105 is completed, the controller (not illustrated) may control the start of the individual fuel cell stack 101 on the basis of the charged power of the low-voltage battery 105 that is connected to the individual fuel cell stack 101. This is because the low-voltage battery 105 has a low voltage and the start of the individual fuel cell stack 101 is not capable of being controlled. At this time, the generated power of the fuel cell stack 101 that is started-up is not used, and the start of the individual fuel cell stack 101 is capable of being controlled on the basis of the charged power of the low-voltage battery 105.

Conversely, when it is determined that the bidirectional converter 104 has failed, the controller (not illustrated) is not capable of charging the low-voltage battery 105 on the basis of the generated power of the fuel cell stack 101 that is started-up due to the failure of the bidirectional converter 104, so that the controller is not capable of controlling the start of the fuel cell stack 101 connected to the bidirectional converter 104 that is determined to have failed. Therefore, since the start of the fuel cell stack 101 connected to the bidirectional converter 104 that is determined to have failed is not controlled and the start of the normal individual fuel cell stack 101 excluding the fuel cell stack 101 connected to the bidirectional converter 104 that is determined to have failed is controlled, the start of the plurality of fuel cell stacks 101 may be efficiently controlled and failure of the start may be minimized.

12 V, which is a voltage determination standard of the low-voltage battery 105 that is described above, is an example, but is not necessarily limited thereto, and it is obvious to those skilled in the art that the voltage may be set differently according to a setting condition.

Before controlling the start of the individual fuel cell stack 101 of the controller (not illustrated) that is described above, the number of the individual fuel cell stacks 101 in which the start thereof is capable of being controlled is required to be calculated in advance. To this end, the controller (not illustrated) is required to firstly calculate whether the generated power of the fuel cell stack 101 that is started-up is sufficient to control the individual fuel cell stack 101. Specifically, the controller (not illustrated) may determine whether the generated power is sufficient on the basis of the generated power of the fuel cell stack 101 that is started-up, a required power of the auxiliary device 103 after the started-up state, and a power consumption of the auxiliary device 103 at the started-up state.

For example, an embodiment in which the representative fuel cell stack 101 is firstly started-up is assumed. It is assumed that a maximum output of the representative fuel cell stack 101 that is started-up is 90 kW, a power consumption of the auxiliary device 103 at the started-up state is 10 kW, and a required power of the auxiliary device 103 after the started-up state is 30 kW. At this time, the number of the individual fuel cell stacks 101 in which the start thereof is capable of being controlled is six that is (90 kW−30 kW)/10 kW, so that a total of seven fuel cell stacks 101 may constitute one group when the representative fuel cell stack 101 is included. As another embodiment, the start of the representative fuel cell stack 101 and the start of the individual fuel cell stack 101 that is shut-down may be controlled at the same time. It is assumed that an output of the representative fuel cell stack 101 during starting-up is 30 kW that is not including the power consumption of the auxiliary device 103. At this time, the number of the individual fuel cell stacks 101 in which the start thereof is capable of being controlled is (30 kW)/10 kW=3, so that a total of four fuel cell stacks 101 may constitute one group when the representative fuel cell stack 101 is included.

Consequently, a required output of the individual fuel cell stack 101 according to the determination of the number of individual fuel cell stacks 101 in which the start thereof is capable of being controlled may be calculated as follows. The controller (not illustrated) may control the start of the representative fuel cell stack 101 excluding the fuel cell stack 101 that is determined to have failed. At this time, the required output may be calculated by (a value obtained by subtracting the number of representative fuel cell stacks 101 that is not determined to have failed from the number of the plurality of fuel cell stacks 101 in the group)*(the power consumption of the auxiliary device 103)+(the required power of the auxiliary device 103 of the representative fuel cell stack 101). If the voltage of the low-voltage battery 105 is lowered, the required output may be calculated by (a value obtained by subtracting the number of representative fuel cell stacks 101 that is not determined to have failed from the number of the plurality of fuel cell stacks 101 in the group)*(the power consumption of the auxiliary device 103)+(the required power of the auxiliary device 103 of the representative fuel cell stack 101)+(a charge output of the bidirectional converter 104/the number of representative fuel cell stacks 101 that is not determined to have failed).

It will be described on the basis of the embodiment described above with reference to FIGS. 3 to 6.

FIGS. 3 to 6 are graphs showing output diagrams of the plurality of fuel cell stacks 101 constituting the fuel cell start control system according to an embodiment of the present invention.

Figure 3:
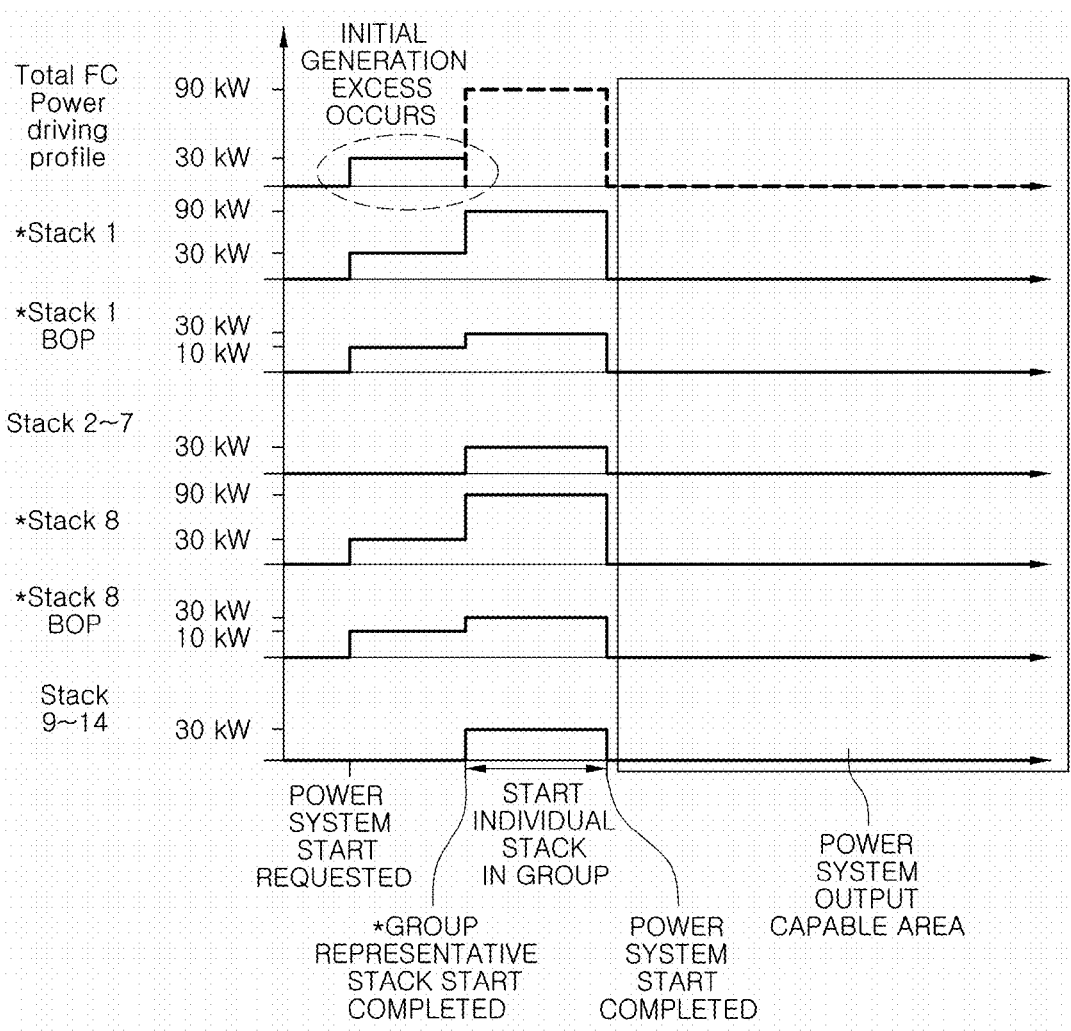
FIGS. 3 to 6 are graphs showing output diagrams of a plurality of fuel cell stacks constituting the fuel cell start control system according to an embodiment of the present disclosure.

Referring to FIG. 3, it is assumed that the fuel cell stack 101 is constituted of two groups, each group is constituted of seven fuel cell stacks 101, and each group has one representative fuel cell stack 101 that is started-up. At this time, after a request of the start of the power system 109, it is assumed that first and eighth stacks (the representative fuel cell stacks 101) both output 90 kW, and the power consumption of the auxiliary device 103 of both the first and eighth stacks is 30 kW. At this time, since an initial generation excess of both the first and eight stacks is 60 kW that is obtained by subtracting 30 kW from 90 kW, the controller (not illustrated) may control the start of total of 12 individual fuel cell stacks 101 that are second to seventh stacks and ninth to fourteenth stacks. Therefore, the maximum output of the fuel cell stacks 101 may be calculated as 30 kW*12=360 kW.

Figure 4:
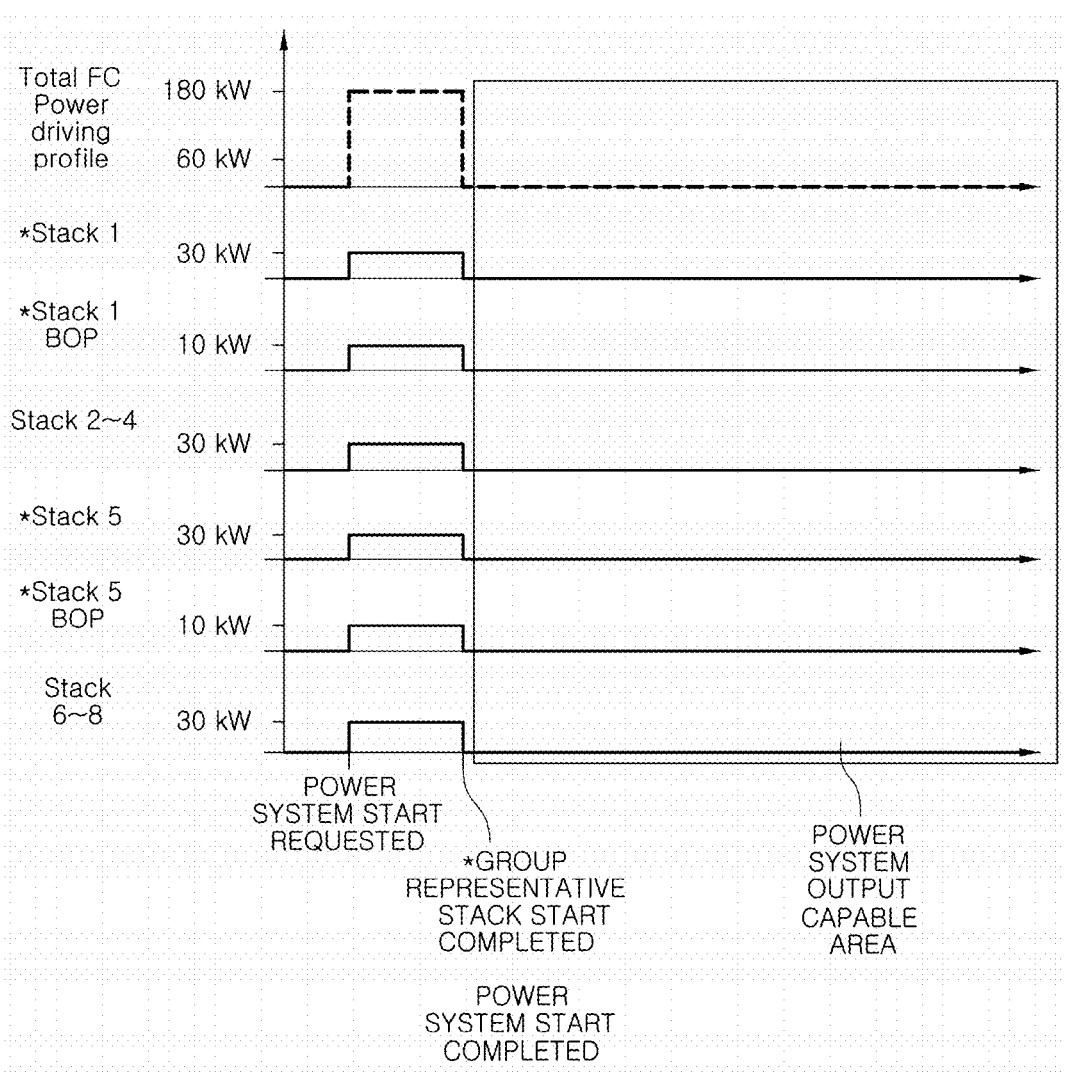

Referring to FIG. 4, it is assumed that the fuel cell stack 101 is constituted of two groups, each group is constituted of four fuel cell stacks 101, and each group has one representative fuel cell stack 101 that is started-up. In this situation, the start of the representative fuel cell stack 101 and the start of the individual fuel cell stack 101 that is shut-down are controlled at the same time. After a request of the start of the power system 109, it is assumed that first and fifth stacks (the representative fuel cell stacks 101) are configured such that a value subtracting the power consumption of the auxiliary device 103 outputs 30 kW. At this time, the controller (not illustrated) may control the start of first and fifth stacks and with the start of total of six individual fuel cell stacks 101 that are second to fourth stacks and sixth to eighth stacks. Therefore, the maximum output of the fuel cell stacks 101 may be calculated as 30 kW*6=180 kW.

Figure 5:
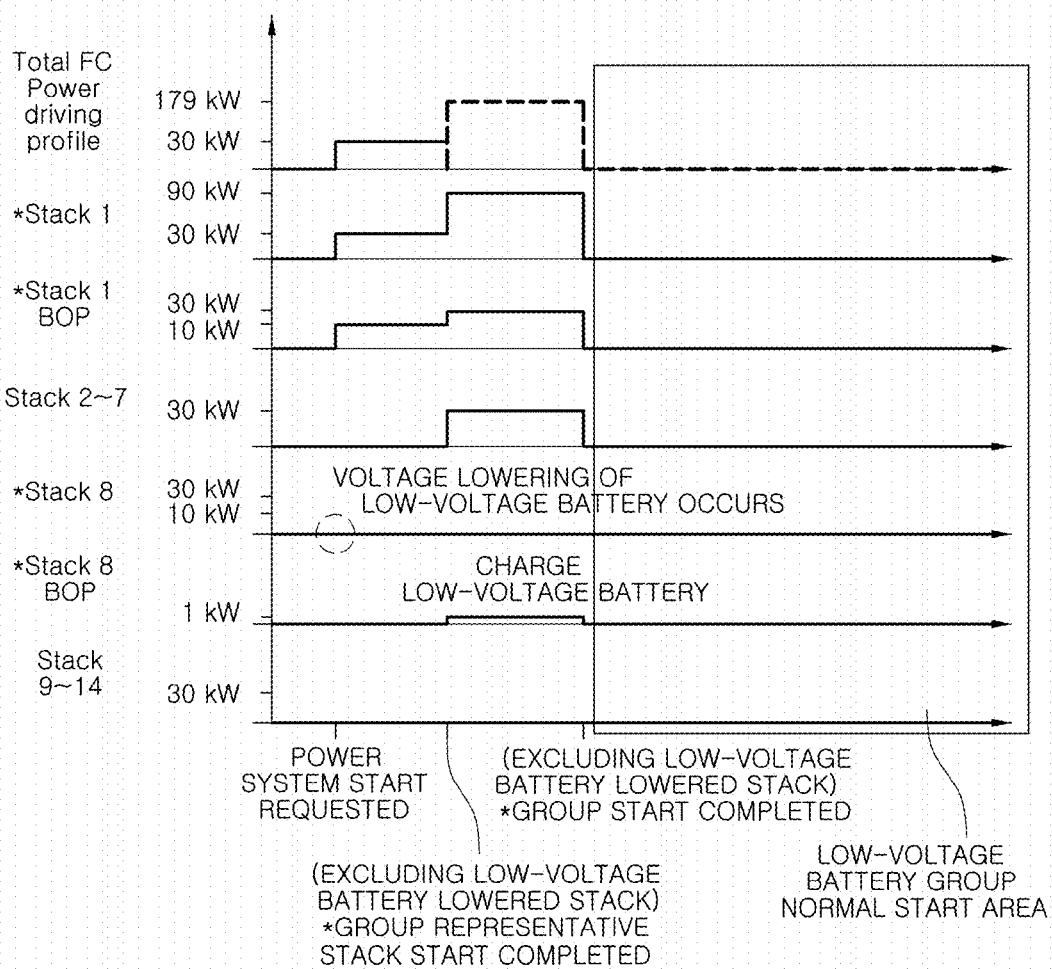

Referring to FIG. 5, as same as FIG. 3, it is assumed that the fuel cell stack 101 is constituted of two groups, each group is constituted of seven fuel cell stacks 101, and each group has one representative fuel cell stack 101 that is started-up. When it is determined that the voltage of the low-voltage battery 105 of the eighth stack that is the representative fuel cell stack 101 is low, the controller (not illustrated) may charge the low-voltage battery 105 at 1 kW without controlling the start of the eighth stack. Accordingly, 60 kW, which is a value obtained by subtracting 30 kW that is the power consumption of the auxiliary device 103 of the first stack from 90 kW that is the output of the first stack, and 180 kW, which is the output of the second to seventh stacks calculated by 30 kW*6=180 kW, are added, and then 60 kW calculated by 10 kW*6=60 kW that is the power consumption of the auxiliary device 103 of the second to seventh stacks is subtracted from 239 kW that is a value excluding 1 kW that is used to charge the low-voltage battery 105 of the eighth stack, so that 179 kW of the maximum output of the fuel cell stack 101 may be calculated.

Figure 6:
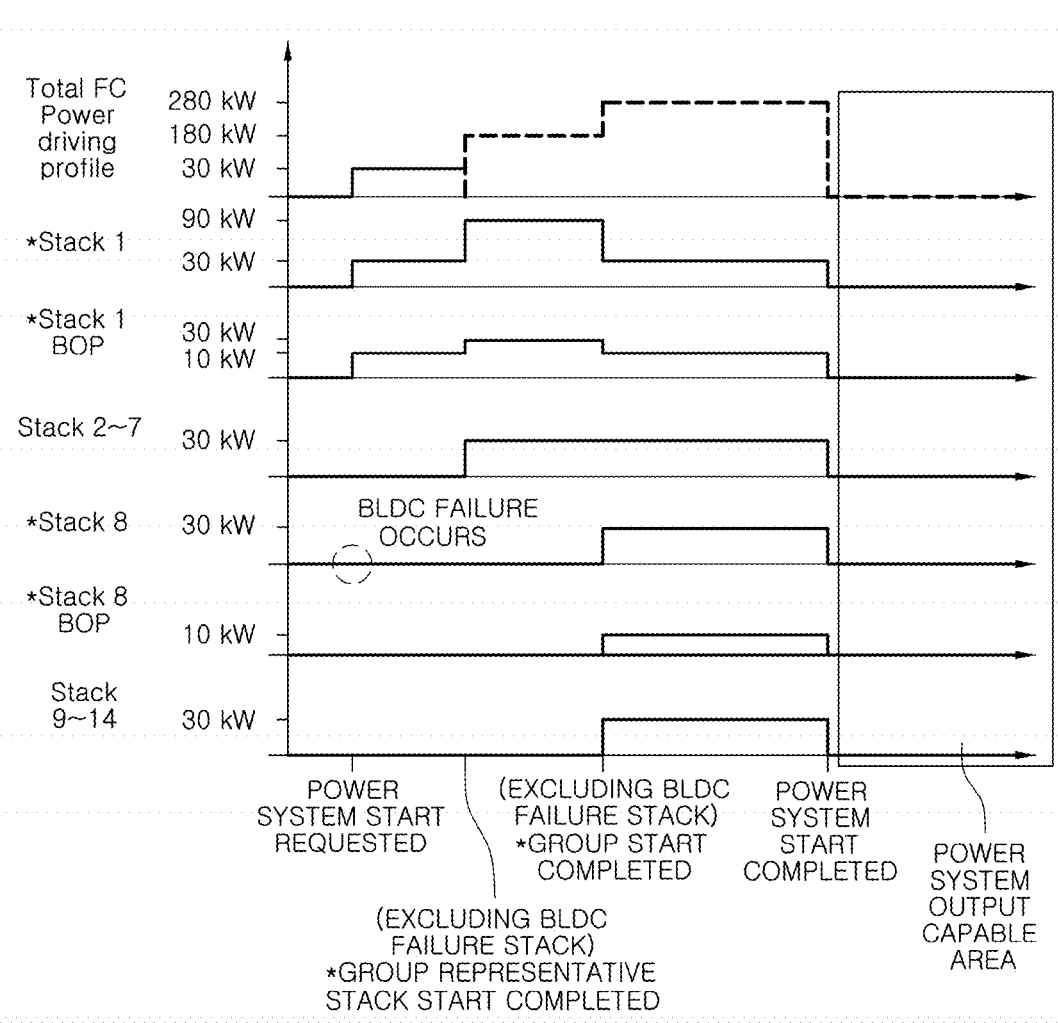

Referring to FIG. 6, as same as FIG. 3, it is assumed that the fuel cell stack 101 is constituted of two groups, each group is constituted of seven fuel cell stacks 101, and each group has one representative fuel cell stack 101 that is started-up. At this time, when the bidirectional converter 104 of another individual fuel cell stack 101 is determined to have failed, the controller (not illustrated) may control the start of the fuel cell stack 101 (the eighth stack) excluding the fuel cell stack 101 in which the bidirectional converter 104 is determined to have failed. At this time, the maximum output of the fuel cell stack 101 in a state in which the start control of the first stack is completed is 180 kW, in which 180 kW is obtained by adding 90 kW−30 kW=60 kW that is the output of the first stack to 120 kW that is obtained by subtracting 10 kW*6=60 kW that is the power consumption of the auxiliary device 103 of the second to seventh stacks from 180 kW that is the output of the second to seventh stacks.

In addition, when the start control is completed up to the individual fuel cell stack 101, 280 kW may be calculated by subtracting 140 kW that is the power consumption of the auxiliary device 103 of the first to fourteenth stacks from 420 kW that is the total output of the first to fourteenth stacks.

A fuel cell start control method according to an embodiment on the basis of the configuration of the fuel cell start control system that is described above will be described with reference to FIG. 7.

Figure 7:
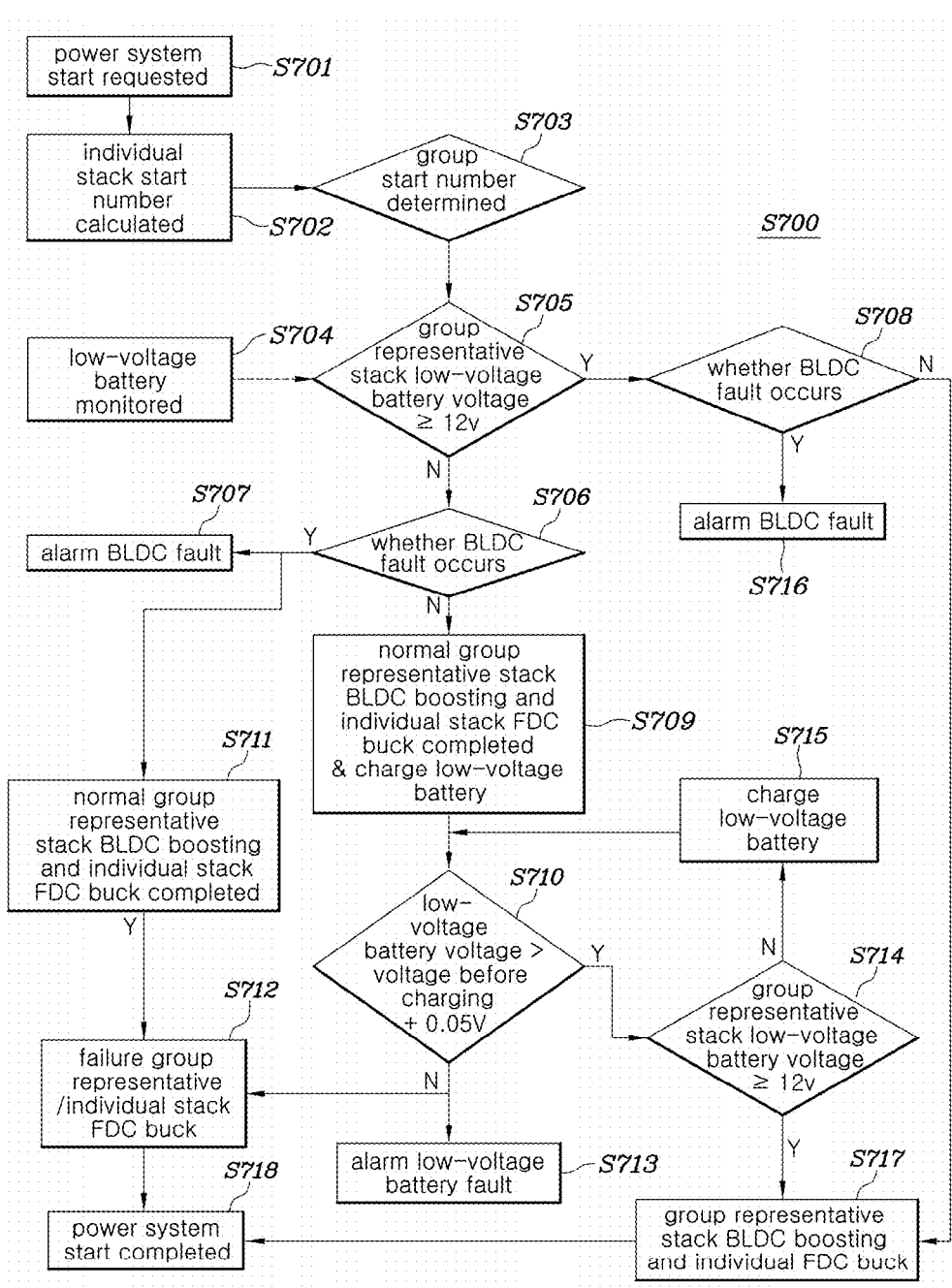
FIG. 7 is a flowchart illustrating a process of controlling the fuel cell start control system according to an embodiment of the present disclosure.

FIG. 7 is a flowchart S700 illustrating a process of controlling the fuel cell start control system according to an embodiment of the present disclosure.

Referring to FIG. 7, firstly, the power system 109 may require a start to the fuel cell system 100 S701. The controller (not illustrated) may calculate the number of individual fuel cell stacks 101 in which the start thereof is capable of being controlled according to a request of the start. After then, the controller (not illustrated) may determine whether a start control group is determined on the basis of the number of fuel cell stacks 101 in which the start thereof is capable of being controlled S703. When the start control group is determined, the controller (not illustrated) may determine whether a charging voltage of the low-voltage battery 105 connected to the fuel cell stack 101 is equal to or more than a reference value or less than the reference value S705. When it is determined that the charging voltage of the low-voltage battery 105 is less than the reference value (NO in S705), the controller (not illustrated) may determine whether the bidirectional converter 104 has failed S706. When it is determined that the bidirectional converter 104 has failed (YES in S706), the controller (not illustrated) may transmit a failure alarm S707, and the controller (not illustrated) may control the start of the individual fuel cell stack 101 by boosting the bidirectional converter 104 of the normal representative fuel cell stack 101 that is not failed S711. When it is determined that the bidirectional converter 104 is normal (NO in S706), the controller (not illustrated) may control the start of the individual fuel cell stack 101 by boosting the bidirectional converter 104 of the normal representative fuel cell stack 101 that is not failed, and the controller (not illustrated) may charge the voltage of the low-voltage battery 105 S709. Then, whether a charging of the voltage of the low-voltage battery 105 at a predetermined voltage is continuously performed is determined S710, and a failure signal of the low-voltage battery 105 may be transmitted when the charging is not properly performed (NO in S710) S713. Whether the voltage of the low-voltage battery 105 is equal to or more than the predetermined voltage is determined S714 while the charging of the voltage of the low-voltage battery 105 at the predetermined voltage is continuously performed. Furthermore, when a result is determined that the voltage is less than the predetermined voltage, the charging of the voltage of the low-voltage battery 105 at the predetermined voltage may be continuously performed S715. When it is determined that the voltage of the low-voltage battery 105 is equal to or more than the predetermined voltage, the start of the individual fuel cell stack 101 may be controlled by boosting the bidirectional converter 104 of the representative fuel cell stack 101 S717. The start of the individual fuel cell stack 101 is controlled, and the start of the individual fuel cell stack 101 is capable of being completed S718.

Eventually, according to the fuel cell start control system and the control method therefor according to the present disclosure, since the start of the plurality of fuel cell systems is capable of being efficiently controlled by monitoring the power storage device and the bidirectional converter, a start failure of a group constituting of the fuel cell stacks may be prevented and a start of the fuel cell stacks may be controlled according to a target output.

In an exemplary embodiment of the present disclosure, the controller may be realized by a non-volatile memory (not shown) configured to store an algorithm for controlling the operation of various elements of a vehicle or data on software commands for executing the algorithm and a processor (not shown) configured to perform an operation, which will be described below, using the data stored in the memory. Here, the memory and the processor may be realized as individual chips. Alternatively, the memory and the processor may be realized as a single integrated chip. The processor may include one or more processors.

Although exemplary embodiments of the present disclosure have been described herein, it is understood that the present disclosure should not be limited to these exemplary embodiments and that various changes and modifications can be made by one ordinary skilled in the art within the spirit and scope of the present disclosure.

What is claimed is:

1. A fuel cell start control system comprising:
   a plurality of fuel cell stacks configured to generate power by receiving air and fuel;
   at least one bidirectional converter connected to at least one fuel cell among the plurality of fuel cell stacks;
   at least one power storage device connected to the bidirectional converter of the at least one fuel cell stack and configured to be charged by generated power of a respective fuel cell stack of the plurality of fuel cell stacks or configured to be discharged so as to supply power; and
   a controller configured to control a start of at least one first fuel cell stack among the plurality of fuel cell stacks which satisfies a start condition based on a fuel cell stack starting request, the controller configured to control a start of at least one second fuel cell stack including at least one fuel cell stack excluding the at least one first fuel cell stack among the plurality of fuel cell stacks based on generated power of the at least one first fuel cell stack or charged power of at least one power storage device connected to the at least one first fuel cell stack and charged by the generated power of the at least one first fuel cell stack,
   wherein the start condition comprises a voltage condition of the at least one power storage device connected to the at least one fuel cell stack, and comprises a failure condition of the at least one bidirectional converter,
   wherein, when a charging voltage of the at least one power storage device connected to the at least one second fuel cell stack is less than a reference value, the controller is configured to determine whether the at least one bidirectional converter connected to the at least one second fuel cell stack is normal, thereby controlling the start of the at least one second fuel cell stack,
   wherein in response to a determination that the at least one bidirectional converter connected to the at least one second fuel cell stack is normal, the controller is configured to control such that the at least one power storage device connected to the at least one second fuel cell stack is charged by the generated power of the at least one first fuel cell stack,
   wherein the controller is configured to control the start of the at least one second fuel cell stack, after the at least one power storage device connected to the at least one second fuel cell stack is completely charged, based on the charged power of the at least one power storage device connected to the at least one second fuel cell stack.

2. The fuel cell start control system of claim 1, wherein in response to a determination that the at least one bidirectional converter connected to the at least one second fuel cell stack is not normal, the controller is configured to control the start of the at least one second fuel cell stack excluding at least one third fuel cell stack connected to the at least one bidirectional converter which is not normal.

3. A fuel cell start control system comprising:

a plurality of fuel cell stacks configured to generate power by receiving air and fuel;

at least one bidirectional converter connected to at least one fuel cell among the plurality of fuel cell stacks;

at least one power storage device connected to the bidirectional converter of the at least one fuel cell stack and configured to be charged by generated power of a respective fuel cell stack of the plurality of fuel cell stacks or configured to be discharged so as to supply power; and a controller configured to control a start of at least one first fuel cell stack among the plurality of fuel cell stacks which satisfies a start condition based on a fuel cell stack starting request, the controller configured to control a start of at least one second fuel cell stack including at least one fuel cell stack excluding the at least one first fuel cell stack among the plurality of fuel cell stacks based on generated power of the at least one first fuel cell stack or charged power of at least one power storage device connected to the at least one first fuel cell stack and charged by the generated power of the at least one first fuel cell stack, wherein the controller is configured to calculate the generated power of the at least one first fuel cell stack, and is configured to calculate the number of the second fuel cell stacks in which the start thereof is capable of being controlled based on the calculated generated power.

4. The fuel cell start control system of claim 3, wherein the controller is configured to calculate the number of the second fuel cell stacks in which the start thereof is capable of being controlled based on the generated power of the at least one first fuel cell stack, a required power of an auxiliary device after a started-up state, and a power consumption of the auxiliary device at the started-up state.

5. A fuel cell start control system comprising:

a plurality of fuel cell stacks configured to generate power by receiving air and fuel;

at least one bidirectional converter connected to at least one fuel cell among the plurality of fuel cell stacks;

at least one power storage device connected to the bidirectional converter of the at least one fuel cell stack and configured to be charged by generated power of a respective fuel cell stack of the plurality of fuel cell stacks or configured to be discharged so as to supply power; and a controller configured to control a start of at least one first fuel cell stack among the plurality of fuel cell stacks which satisfies a start condition based on a fuel cell stack starting request, the controller configured to control a start of at least one second fuel cell stack including at least one fuel cell stack excluding the at least one first fuel cell stack among the plurality of fuel cell stacks based on generated power of the at least one first fuel cell stack or charged power of at least one power storage device connected to the at least one first fuel cell stack and charged by the generated power of the at least one first fuel cell stack, wherein the controller is configured to calculate a value as a target output in which the value is obtained by subtracting a power consumption of an auxiliary device from a value obtained by adding generated power of the plurality of fuel cell stacks and supplied power of the at least one power storage device, and is configured to control the start of the plurality of fuel cell stacks according to the calculated target output.

* * * * *